United States Patent
Burd

(10) Patent No.: US 9,889,935 B2
(45) Date of Patent: Feb. 13, 2018

(54) AIRCRAFT GALLEY CART BAY DOOR

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/302,648

(22) Filed: Jun. 12, 2014

(65) Prior Publication Data

US 2014/0366454 A1    Dec. 18, 2014

Related U.S. Application Data

(60) Provisional application No. 61/836,413, filed on Jun. 18, 2013.

(51) Int. Cl.
| | |
|---|---|
| *E06B 3/00* | (2006.01) |
| *B64D 11/04* | (2006.01) |
| *E06B 7/16* | (2006.01) |
| *A47B 31/06* | (2006.01) |
| *B62B 3/00* | (2006.01) |
| *A47B 31/00* | (2006.01) |

(52) U.S. Cl.
CPC .............. *B64D 11/04* (2013.01); *A47B 31/06* (2013.01); *B62B 3/004* (2013.01); *E06B 7/16* (2013.01); *A47B 2031/002* (2013.01); *B62B 2202/67* (2013.01); *Y02T 50/46* (2013.01)

(58) Field of Classification Search
CPC .......... B64D 11/04; B64C 1/1461; E06B 7/16

USPC ................ 244/118.5; 49/401, 501
See application file for complete search history.

(56) References Cited

U.S. PATENT DOCUMENTS

| | | | | |
|---|---|---|---|---|
| 1,329,453 | A | * | 2/1920 | Bohn ............................. 49/401 |
| 1,923,701 | A | * | 8/1933 | Bohn ............................. 49/401 |
| 2,978,755 | A | * | 4/1961 | Walker .......................... 49/401 |
| 3,051,260 | A | * | 8/1962 | Eckel ............................ 181/287 |
| 3,055,969 | A | * | 9/1962 | Schaller, Jr. .................. 174/369 |
| 3,426,482 | A | * | 2/1969 | Mock ............................. 49/501 |
| 3,437,735 | A | * | 4/1969 | Schaller, Jr. .................. 174/367 |

(Continued)

FOREIGN PATENT DOCUMENTS

| | | | | |
|---|---|---|---|---|
| DE | 4216277 | A1 * | 11/1993 | .............. B64C 1/10 |
| EP | 1445381 | A1 * | 8/2004 | |

(Continued)

OTHER PUBLICATIONS

Boeing 787 from the Ground Up, magazine, 4th Quarter 2006, 9 pages.

(Continued)

*Primary Examiner* — Jerry E Redman
(74) *Attorney, Agent, or Firm* — Donna P. Suchy

(57) ABSTRACT

An aircraft galley cart bay door includes a door main structure having an inwardly facing peripheral inner edge with an inner surface, and a surface seal on the inner surface of the inwardly facing peripheral inner edge of the inner wall. A substantial majority of the main structure of the door is formed from a high strength molded carbon fiber composite material. The door main structure may optionally define a recess, and insulation material can be disposed in the recess defined by the main structure of the door.

9 Claims, 1 Drawing Sheet

(56) References Cited

U.S. PATENT DOCUMENTS

| | | | | |
|---|---|---|---|---|
| 3,462,899 A * | 8/1969 | Sherman | | 52/309.6 |
| 3,906,744 A | 9/1975 | Knapp et al. | | |
| 4,175,357 A * | 11/1979 | Goldhaber | | 49/395 |
| 4,200,956 A * | 5/1980 | Ullman, Jr. | | 16/235 |
| 4,486,482 A * | 12/1984 | Kobayashi et al. | | 428/69 |
| 4,536,990 A * | 8/1985 | Siegrist et al. | | 49/501 |
| 4,663,885 A * | 5/1987 | Stibolt | | 49/67 |
| 4,784,902 A * | 11/1988 | Crompton | | 442/373 |
| 5,601,897 A * | 2/1997 | Vermilion et al. | | 428/69 |
| 5,912,944 A * | 6/1999 | Budinski | | G03B 42/04 378/182 |
| 5,943,390 A * | 8/1999 | Wendlandt | | G03B 42/04 250/483.1 |
| 6,530,330 B2 * | 3/2003 | Sepe et al. | | 108/44 |
| 7,040,575 B2 * | 5/2006 | Struve et al. | | 244/118.5 |
| 7,798,287 B1 * | 9/2010 | Surace et al. | | 181/290 |
| D669,013 S * | 10/2012 | Schreuder | | D12/345 |
| 8,690,170 B2 * | 4/2014 | Belanger et al. | | 280/79.3 |
| 8,936,260 B2 * | 1/2015 | Burd | | 280/47.35 |
| 2001/0050519 A1 | 12/2001 | Kasuya | | |
| 2005/0193760 A1 | 9/2005 | Moran et al. | | |
| 2005/0218615 A1 | 10/2005 | Hu | | |
| 2006/0070814 A1 * | 4/2006 | Hu | | 186/45 |
| 2009/0233044 A1 * | 9/2009 | Sun et al. | | 428/113 |
| 2011/0047873 A1 * | 3/2011 | Kuhn et al. | | 49/13 |
| 2011/0215199 A1 * | 9/2011 | Lee | | 244/118.5 |
| 2011/0284687 A1 * | 11/2011 | Parker | | 244/99.5 |
| 2012/0006941 A1 * | 1/2012 | Tan et al. | | 244/118.5 |
| 2013/0227891 A1 * | 9/2013 | Cox et al. | | 49/394 |
| 2014/0137574 A1 * | 5/2014 | Hothi | | 62/62 |
| 2014/0152027 A1 * | 6/2014 | Burd | | 292/200 |
| 2014/0193608 A1 * | 7/2014 | Polewarczyk | | B32B 5/18 428/140 |
| 2014/0196272 A1 * | 7/2014 | Krajewski | | B21J 15/02 29/525.06 |
| 2015/0115505 A1 * | 4/2015 | Jones | | B29C 70/345 264/511 |
| 2016/0009361 A1 * | 1/2016 | Roborel De Climens | | B64C 1/18 244/120 |
| 2016/0088910 A1 * | 3/2016 | Axton | | A45C 5/02 206/524.3 |

FOREIGN PATENT DOCUMENTS

| | | |
|---|---|---|
| EP | 1681237 A1 | 7/2006 |
| WO | 9701475 A1 | 1/1997 |
| WO | WO 2013014283 A1 * | 1/2013 |

OTHER PUBLICATIONS

International Search Report, dated Oct. 15, 2014, 5 pages, from PCT/US2014/042946, published as WO 2014/205082 dated Dec. 24, 2014.

\* cited by examiner

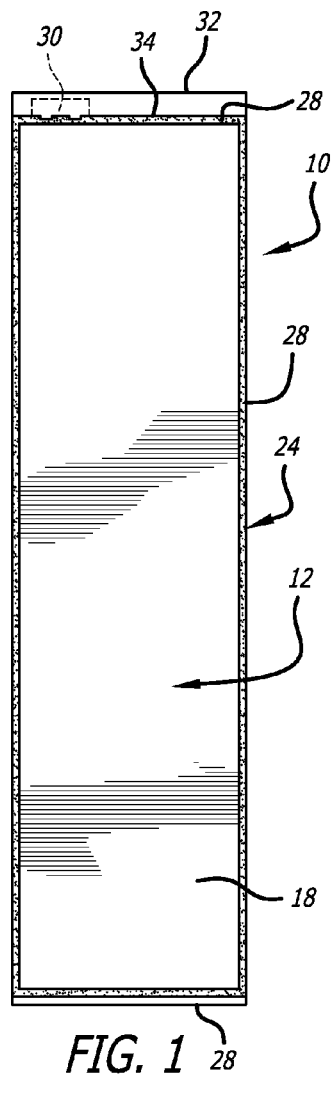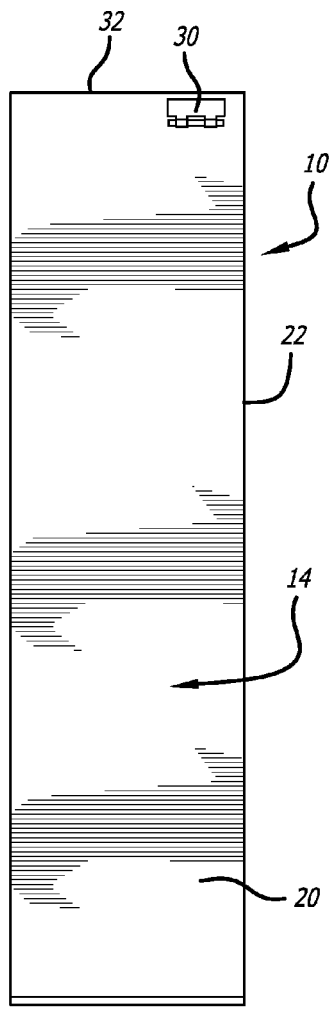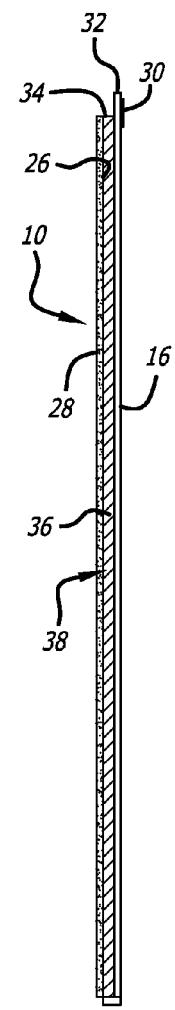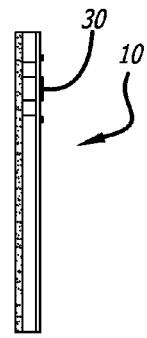

AIRCRAFT GALLEY CART BAY DOOR

CROSS-REFERENCES TO RELATED APPLICATIONS

This application is based upon and claims priority from U.S. Provisional Application No. 61/836,413, filed Jun. 18, 2013, incorporated by reference in its entirety.

This invention relates generally to aircraft catering or galley carts, and more particularly relates to an aircraft galley cart bay door with an inner edge having an inner face with an improved seal construction.

BACKGROUND

On commercial aircraft with in-flight catering services, galley carts are commonly used to transport meals from an aircraft galley to passengers. Such galley carts typically have aluminum door edges that are thermally conductive, and that consequently can interfere with thermal insulation of the galley carts, acting as "cold bridges" in chilled cart bays, for example. Other metal components of the main structure of a door of such conventional galley carts can also to some extent interfere with proper thermal insulation of the galley carts. Such conventional galley cart doors also typically provide a "plug" door seal upon closure by a sweeping action of the door.

It would be desirable to provide an aircraft galley cart bay door that utilizes a carbon fiber reinforced composite material as a major portion of the main structural material of the door to significantly reduce weight and strength of the door, to allow the door to be used for retention of contents of the galley cart as well, and to significantly reduce cold bridging in chilled cart bay galleys through the elimination of metallic components. It would also be desirable to provide an aircraft galley cart bay door that includes an inward facing periphery that allows a compression seal to be achieved, improving and simplifying the sealing, and reducing wear. The present invention meets these and other needs.

SUMMARY OF THE INVENTION

Briefly, and in general terms, the present invention provides for an ultra light weight galley cart bay or compartment door having molded carbon fiber reinforced composite material forming a substantial majority of a main structure of the door, and having an inner edge turned inward to allow a seal to be fitted on an inner face of the inner edge of the door to improve the sealing capability of the door and to reduce seal wear of the door.

Accordingly, the present invention provides for an aircraft galley cart bay door having an inner side and an outer side, the aircraft galley cart bay door including a door main structure having an inner wall with an inwardly facing peripheral inner edge having an inner surface, and a surface seal on the inner surface of the inwardly facing peripheral inner edge of the inner wall. In a presently preferred aspect, a substantial majority of the main structure of the door is formed from a high strength molded carbon fiber composite material. In another presently preferred aspect, the door main structure defines a recess, and insulation material is disposed in the recess defined by the main structure of the door. In another presently preferred aspect, the aircraft galley cart bay door includes a latch located adjacent to an upper end of the aircraft galley cart bay door on the outer wall. In another presently preferred aspect, the inner wall of the aircraft galley cart bay door has an upper shoulder formed along an upper edge of the inner wall, and the latch is located adjacent to the upper shoulder of the inner wall. In another presently preferred aspect, a substantial majority of the door main structure is formed from a high strength molded carbon fiber composite material.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1 is a rear view of the aircraft galley cart bay door according to the present invention.

FIG. 2 is a front view of the aircraft galley cart bay door of FIG. 1.

FIG. 3 is a side view of the aircraft galley cart bay door of FIG. 1.

FIG. 4 is a top view of the aircraft galley cart bay door of FIG. 1.

DETAILED DESCRIPTION OF THE PREFERRED EMBODIMENTS

Referring to the drawings, which are provided for purposes of illustration and by way of example, the present invention provides for an ultra light weight galley cart bay or compartment door having a main structure that is composed of molded carbon fiber reinforced composite, in which an inner edge of the door is turned inward to allow a seal to be fitted on its inner face to improve its sealing capability and to reduce seal wear.

As is illustrated in FIGS. 1-4, the aircraft galley cart bay door 10 includes an inner side 12 and an outer side 14. A main structure 16 of the door includes an inner wall 18, an outer wall 20, and side edges 22. A substantial majority of the main structure of the door preferably is formed from a high strength molded carbon fiber composite material that reduces the thickness and weight of the door, and allows the door to act as a primary retention device.

An inward facing peripheral inner edge or edge return 24 of the door includes an inner face 26 having a surface seal 28 that allows a compression seal to be achieved, improving and simplifying the sealing capability and reducing wear.

A latch 30 is typically located near an upper end 32 or flange of the door, adjacent to an upper shoulder 34 formed along an upper edge of the inner wall. Insulation material 36 may be incorporated into a recess 38 formed by the main structure of the door.

It should be appreciated that the design of the aircraft galley cart bay door of the invention allows the use of internal concealed hinges, and eliminates the use of bonded aluminum door edges, removing them as cold bridges in chilled cart bays.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. An aircraft galley cart bay door having an inner side and an outer side, the aircraft galley cart bay door comprising:
    an elongated aircraft galley cart bay door main structure, said elongated door main structure including an inner wall, an outer wall, and side edges, said inner wall including an inwardly facing peripheral inner edge projecting inwardly from the side edges and having an inner surface, said outer wall including an upper end projecting above an upper edge of the inner wall to define an upper shoulder formed by the upper end of the outer wall and the upper edge of the inner wall;

a latch located adjacent to the upper end of the outer wall, the latch being further located at least partially above the upper edge of the inner wall;

a surface seal on said inner surface of said inwardly facing peripheral inner edge of said inner wall for adapted to achieve a compression seal of the elongated aircraft galley cart bay door main structure along said inwardly facing peripheral inner edge; and wherein said inner wall, inward facing peripheral edge, upper shoulder and side edges of the door main structure comprise carbon fiber composite material.

2. The aircraft galley cart bay door of claim 1, wherein said door main structure defines a recess, and insulation material is disposed in the recess defined by the main structure of the door.

3. The aircraft galley cart bay door of claim 1, wherein a majority of the elongated aircraft galley cart bay door main structure is composed of carbon fiber composite material.

4. The aircraft galley cart bay door of claim 1, wherein the latch is on said outer wall.

5. An aircraft galley cart bay door comprising:

an elongated aircraft galley cart bay door main structure, said elongated aircraft galley cart bay door main structure including an inner wall, an outer wall, and side edges, said inner wall including an inwardly facing peripheral inner edge projecting inwardly from the side edges and having an inner surface, said outer wall including an upper end projecting above an upper edge of the inner wall to define an upper shoulder formed by the upper end of the outer wall and the upper edge of the inner wall;

a latch located adjacent to the upper end of the outer wall, the latch being further located at least partially above the upper edge of the inner wall; and wherein said inner wall, inward facing peripheral edge, upper shoulder and side edges of the door main structure comprise carbon fiber composite material.

6. The aircraft galley cart bay door of claim 5, wherein said door main structure defines a recess, and insulation material is disposed in the recess defined by the main structure of the door.

7. The aircraft galley cart bay door of claim 5, further comprising a surface seal on said inner surface of said inwardly facing peripheral inner edge of said inner wall adapted to achieve a compression seal of the elongated aircraft galley cart bay door main structure along said inwardly facing peripheral inner edge.

8. The aircraft galley cart bay door of claim 5, wherein a majority of the elongated aircraft galley cart bay door main structure is composed of carbon fiber composite material.

9. The aircraft galley cart bay door of claim 5, wherein the latch is on said outer wall.

* * * * *